US010867122B1

(12) United States Patent
Mertens et al.

(10) Patent No.: US 10,867,122 B1
(45) Date of Patent: *Dec. 15, 2020

(54) CONTEXTUALLY RELEVANT KNOWLEDGE PANELS IN AN APPLICATION ENVIRONMENT

(71) Applicant: Google LLC, Mountain View, CA (US)

(72) Inventors: Timo Mertens, Millbrae, CA (US); Robin Dua, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/420,527

(22) Filed: May 23, 2019

Related U.S. Application Data

(63) Continuation of application No. 14/656,295, filed on Mar. 12, 2015, now Pat. No. 10,366,151.

(51) Int. Cl.
*G06F 40/166* (2020.01)
*G06F 3/0481* (2013.01)

(52) U.S. Cl.
CPC .......... *G06F 40/166* (2020.01); *G06F 3/0481* (2013.01)

(58) Field of Classification Search
CPC .......... G06F 17/20; G06F 17/30; G06F 16/20; G06F 16/30; G06F 16/80; G06F 17/80; G06F 3/048; G06F 40/00
See application file for complete search history.

(56) References Cited

U.S. PATENT DOCUMENTS

| | | |
|---|---|---|
| 5,873,107 A | 2/1999 | Borovoy |
| 9,047,283 B1 | 6/2015 | Zhang |
| 2011/0043652 A1 | 2/2011 | King |
| 2012/0109884 A1 | 5/2012 | Goldentouch |
| 2013/0325463 A1 | 12/2013 | Greenspan et al. |
| 2014/0006424 A1 | 1/2014 | Al-Kofahi et al. |
| 2014/0040238 A1 | 2/2014 | Scott et al. |
| 2014/0046976 A1 | 2/2014 | Zhang et al. |

OTHER PUBLICATIONS

Zack's Equity Research, "Google Ventures Plans to Invest $100M in European Start-ups," Zack's Analyst Blog, Jul. 11, 2014 [retrieved on Jul. 17, 2015]. Retrieved from the Internet: URL<http://www.zacks.com/stock/news/139772/google-ventures-plans-to-invest-100m-in-european-startups>, 3 pages.

*Primary Examiner* — Sanchita Roy
(74) *Attorney, Agent, or Firm* — Fish & Richardson P.C.

(57) ABSTRACT

From the content of a document, a factual entity that relates to the content of the document is determined. Content for a knowledge panel is requested. A knowledge panel is a user interface element that provides a collection of content related to the factual entity. The contents of the knowledge panel is received for contemporaneous display on the user device with the content of the document.

15 Claims, 5 Drawing Sheets

CONTEXTUALLY RELEVANT KNOWLEDGE PANELS IN AN APPLICATION ENVIRONMENT

CROSS-REFERENCE TO RELATED APPLICATIONS

This application is a continuation of U.S. application Ser. No. 14/656,295, filed Mar. 12, 2015, the contents of which are incorporated by reference herein.

ENVIRONMENT

The present document relates to user interfaces of computer application.

BACKGROUND

Many computer applications include a graphical user interface to allow users to read and/or edit a document. The content of the document may relate to one or more entities that are described in other documents.

Often a user may use a search engine to search for information that is contextually relevant to the content subject of the document the user is authoring. The user may then incorporate facts and information into the document. However, when developing search queries to submit to the search engine, the user often needs to provide contextual information of the document in the query. For example, a user may be authoring a document to describe bears in the Smokey Mountains. The query the user will need to formulate will need to express this informational need.

SUMMARY

In general, one innovative aspect of the subject matter described in this specification can be embodied in methods that include the actions of receiving content of a document that is displayed on a user device; determining, from the content of the document that is displayed on the user device, a factual entity that is related to the content of the document; requesting content of a knowledge panel for the factual entity, wherein the knowledge panel is a user interface element that provides a collection of content related to the factual entity; and receiving the contents of the knowledge panel for contemporaneous display on the user device with the content of the document. Other embodiments of this aspect include corresponding systems, apparatus, and computer programs, configured to perform the actions of the methods, encoded on computer storage devices.

The systems and processes described here may be used to provide a number of potential advantages. When a user is shown a document in a document viewer, that document viewer may also contemporaneously show another interface element containing information related to the displayed document. This information can be condensed into a knowledge panel to be displayed to the user. Doing so can allow the user to consume and/or incorporate the information without navigating away from the document. As such, a user can be provided with information and tools in an efficient way without distracting them from the document they are interested in, authoring, reviewing, or editing. These tools can include, but are not limited to, tools to add content to the document, perform a search, navigate to a different document, or start a communication with another user. The presentation of the knowledge panel within the application environment also facilitates a simple and efficient user interaction model by which the user can easily incorporate relevant information. Additional background data on a relevant topic can be shown to a user without requiring the user to perform multiple searches or review related documents. Users can be provided with instant access to a plurality of content like web page snippets, document snippets, video, images, maps, facts, emails, and contacts. Content can also include a reference to a related book available for purchase (with an embedded buy button), a news article, or a hyperlink to relevant content. Users can be given the ability to drag and drop to insert information from a knowledge panel into the document being authored, in for them of text, images, video, graphics, or hyperlinks to the same. Content can be automatically incorporated into the content of a document with natural language and/or with appropriate citations. The ability to display and pivot information is handled in a dialog flow. For example, a knowledge panel may show information about a person, and then receive a command (e.g. a verbal user input) to "show me videos about him." In response, the knowledge panel can show a video of the person in the knowledge panel, rather than navigating to another application.

Other features, aspects and potential advantages will be apparent from the accompanying description and figures.

DESCRIPTION OF DRAWINGS

Like reference symbols in the various drawings indicate like elements

DETAILED DESCRIPTION

Figure 1:
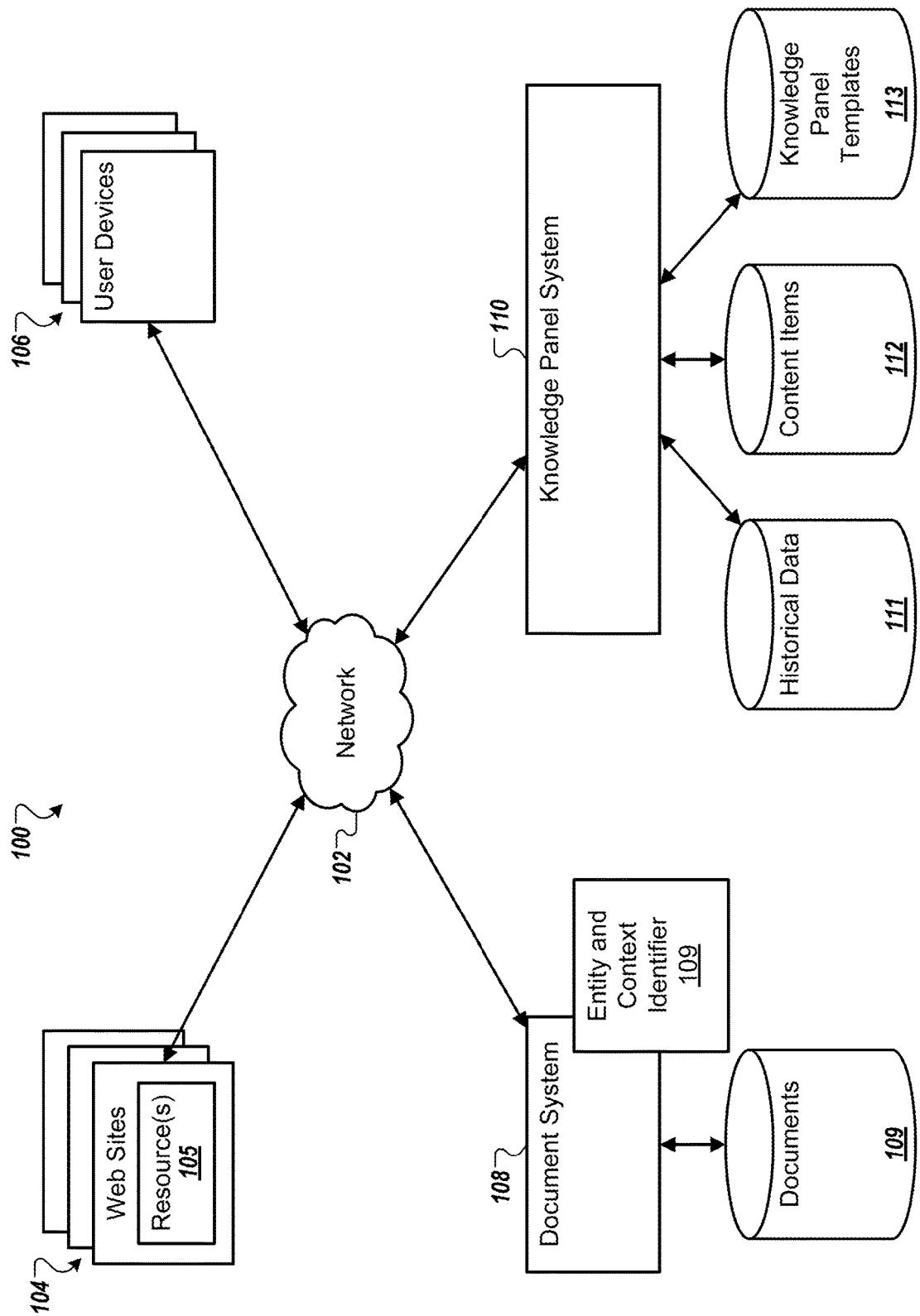
FIG. 1 is a block diagram of an example of an environment in which a document may be edited.

When a user reads or generates a document, the document's application can generate and display knowledge panels with the document. A knowledge panel is a user interface element that provides information or other content related to a particular entity referenced by the document, as well as attributes of the entity. Entities can include, but are not limited to, a person, place, country, landmark, animal, historical event, organization, business, sports team, sporting event, movie, song, album, game, work of art, or any other appropriate entity.

In some implementations, a knowledge panel provides a summary of information for the entity. For example, a knowledge panel for a singer may include the name of the singer, an image of the singer, a description of the singer, one or more facts about the singer, and content that identifies songs and albums recorded by the singer. Other types of information and content can also be presented in the knowledge panel. In some implementations, a knowledge panel can provide more granular information. For example, if a document section is about the singer's childhood, the knowledge panel can provide information regarding the school the singer attended, a snippet about the town the singer grew up in, and the singer's recollections of growing up there.

The content of a knowledge panel may include content published or otherwise provided by multiple resources, such as multiple web pages, databases, emails, movies, video clips, music, audio clips, pointers to electronic books, images, maps, contacts, contracts, documents stored in cloud storage, documents stored locally to a user device, or any other technologically appropriate data store. For example, a knowledge panel for a landmark may include an image of the landmark that has been published on a first web page that is hosted by a first publisher. The knowledge panel may also include a set of facts about the landmark that have been published on a second web page published by a second publisher different from the first publisher.

The content of a knowledge panel may be a selection from a resource or resources, may be an entire resource, or may be an automatically generated summarization. For example, a resource may be an encyclopedia webpage for a particular automobile. The associated content panel may contain a selection of the page, such as an image or the first paragraph of text. In an alternative, the content panel may be a thumbnail rendering of the webpage. In yet another alternative, the knowledge panel may contain a summarization of statistics about the automobile generated based on the contents of the webpage. In yet another alternative, the knowledge panel may contain a summarization of the contents of the webpage A knowledge panel may be presented contemporaneously with a document displayed in an application interface that is separate from a search engine interface. For example, the knowledge panel may be shown in a word processing document, email, spreadsheet, presentation, note taking application, block editor, electronic book viewer, electronic news reader, or the like. Such a presentation may allow the user to review and understand the contents of the knowledge panel without navigating away from the original document. In some cases, the user can also interact with the knowledge panel without navigating away from the document. Once presented, a knowledge panel may be interacted with by the user. For example, the user may select a knowledge panel to receive additional information, may dismiss the knowledge panel, or may drag and drop content out of the knowledge panel into another document.

These features and additional features are described in more detail below.

FIG. 1 is a block diagram of an example of an environment 100 in which a document may be edited. The example environment includes a network 102, e.g., a local area network (LAN); wide area network (WAN), the Internet, or a combination of such networks; web sites 104, user devices 106, a document system 108, and a knowledge panel system 110. The network 102 can be accessed over a wired and/or a wireless communications link. For example, mobile computing devices, such as smartphones can utilize a cellular network to access the network 102. The environment 100 may include millions of web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is data provided over the network 102 and that is associated with a resource address, e.g., a uniform resource locator. Resources 105 that can be provided by a web site 104 include HTML pages, word processing documents, and portable document format (PDF) documents, images, video, and feed sources, to name just a few. The resources 105 can include content, e.g., words, phrases, images and sounds and may include embedded information, e.g., meta information and hyperlinks, and/or embedded instructions, e.g., scripts.

A user device 106 is an electronic device that is under control of a user and is capable of requesting and receiving resources 105 over the network 102. Example user devices 106 include personal computers, mobile computing devices, e.g., smartphones and/or tablet computing devices that can send and receive data over the network 102. In general, mobile computing devices ("mobile devices") refers to user devices that are configured to communicate over a mobile communications network. A smartphone, (i.e., a phone that is enabled to communicate over the Internet) is an example of a mobile device. A user device 106 typically includes a user application, e.g., a web browser, to facilitate the sending and receiving of data over the network 102.

The document system 108 is a system that serves, to user devices 106, a document editing and/or viewing environment. For example, the document system 108 may be a cloud-based document system in which a user is able to load, view create, author, edit, save, and publish any kind of technologically appropriate document. In this environment, the users of the user device 106 may retrieve stored documents 109, generate and edit document 109, etc. The document system 108 may provide most aspects of the document environment (e.g., by serving graphical elements), or may serve only document data and machine-readable information that is rendered into a document environment by the user device 106 that has installed a document editing application.

Although shown as a cloud based service, the document system 108, in other implementations, may be implemented on a user device 106. For example, the document system 108 may be a program or an API of a program that is on the device 106 and that can communicate data to and from the knowledge panel system 110. Thus, while the example implementation is described in the context of a cloud-based system, the features may alternatively be implemented only in a user device that communicates with the knowledge panel system 110. In an alternate embodiment, the features may be implemented in a user device that communicates with a knowledge panel system that also is operating on the same user device.

The document system 108 can communicate with the knowledge panel system 110 to identify, generate, and serve knowledge panels to the user devices 106. If it is determined that a knowledge panel should be provided, the knowledge panel system 110 can generate a knowledge panel by applying historical data 111 and/or content items 112 to a template 113. The templates 113 include placeholder data and structure data that defines a particular type of knowledge panel. For example, for a map-type knowledge panel, a template 113 may include placeholder data for a title, latitude and longitude coordinates, and a map image. The placeholder data of the template 113 can be replaced with historic data 111 and/or content items 112. For the map template 113, the name, latitude and longitude, and map image of a particular city may be used, producing a particular knowledge panel for that city loaded with that city's information. Other types of templates 113 may use historical data 111. For example, for a knowledge panel related to a particular person, historic data 111 that includes an index of communication between that person and the user requesting the knowledge panel may be used. The historical data 11 can be presented as a visual time line that is clickable to any period that can provide related documents or information.

In some implementations, the knowledge panel system 110 may be a subsystem of a search engine that is accessible by a web browser. In other implementations, the knowledge panel system 110 may be a stand-alone system that operates independently of a search engine.

Data describing the content items 112 are stored in an index of entities and data identifying content items relevant to the entities. For example, the index may include data identifying a title for an entity, one or more images relevant to the entity, a description of the entity, one or more facts about the entity, one or more videos relevant to the entity, upcoming events related to the entity, content from a social networking page associated with the entity, automatically generated data showing time-dependant information such as a timeline of interactions related to an entity, and other information or types or categories of content that have been deemed relevant to the entity. Any appropriate data scheme can be used to store and/or reference the content items 112.

The content items for each entity can be hosted from disparate sources and/or disparate publishers. For example, content items for a particular entity can be obtained from several different web pages or other resources that are each hosted by different publisher web sites 104. To illustrate, the content items for a particular actor may include images of the actor received from several different sources and these images can be included in the same knowledge panel that is provided in response to a query that references the particular actor. As another example, an image of a person may be obtained from an official site for the person, and a set of facts and/or description for the person may be obtained from an online encyclopedia.

In some implementations, the knowledge panel system 110 identifies content items for each of a set of entities by crawling the Internet and/or one or more intranets for content related to the entity. The knowledge panel system 110 can also determine which of the obtained content items to provide with a knowledge panel for the entity. For example, some of the content items may be more relevant to the entity or more appropriate for the knowledge panel than other content items. As an example, an image of a person's face may be more appropriate for a knowledge panel than an image of the person taken from a long distance.

The type or categories of content provided in a knowledge panel may be determined based on the particular entity or the type of entity referenced by the knowledge panel, or specific attributes of the entity mentioned in the document, such as a relevant time period, geographic location, or logical association. For example, a knowledge panel for a person may include an image of the person, facts about the person, and references to any public works produced by the person. By way of another example, a knowledge panel for a landmark may include images of the landmark, facts about the landmark, and travel information, such as a map, for a person to travel to the landmark. The categories of content that are included in a knowledge panel can also vary based on the particular entity. For example, a person that has acted in movies and that has also recorded one or more albums may include references to both types of works, video and audio clips of both types of works, or cards to purchase the relevant movies or songs A knowledge panel template may specify the content for a knowledge panel, as described in more detail below. Knowledge panels can be customized depending on what attributes are most relevant to the document. For example, in a document about an actor's career, a knowledge panel can be customized that captures her Hollywood experience instead of her stage acting experience, if she is more well-known for making movies. If the knowledge panel is about one particular movie, the knowledge panel can show relevant information on the movie and her role in the movie. If it is a general document about the actor, the knowledge panel can contain more general information including biographical data, the actor's involvement in politics, etc. In general, knowledge panels can be granular or general based on the context of the document.

Although different types of content can be provided for different types of entities and/or different entities within an entity type, the knowledge panels can be configured to provide a consistent user interface for users. In some implementations, each knowledge panel can have one or more standard types of content items. For example, the standard types of content items can include a title, an image, a description, and one or more facts about the entity for which the knowledge panel is provided.

In some implementations, the title for a knowledge panel is the name of the entity or an alias of the entity. For example, the title for a knowledge panel provided for a person can be the name of the person. Similarly, the title for a knowledge panel provided for a country can be the name of the country.

The description for the knowledge panel can provide an adequate explanation of what the entity is, such as a summary of the entity, without going into so much detail to distract from the document with which the knowledge panel is presented. Candidate descriptions can be obtained from a variety of places, such as prefixes of text from trusted encyclopedia articles or top ranking web pages.

The image for a knowledge panel can be an image representative of the entity for which the knowledge panel is generated. This image may vary based on the type of entity and the entity itself. For example, an image for a country may include a map of the country, while an image for a person may include a representative image of the person.

The image for a knowledge panel may be selected by taking a top ranking image from search results for the entity of the knowledge panel. For example, a web search directed to images can be performed for an entity and the top ranking image may be selected for the search results for inclusion in knowledge panels for the entity.

The set of facts that are presented in a knowledge panel may be determined based on the type of entity and/or the entity itself. For example, certain facts may be preferred for actors, and a different set of facts may be preferred for singers. Also, certain facts may be relevant to certain entities within an entity type, while not being relevant to other entities within the entity type. For example, a knowledge panel for an actor that has won many awards may include a listing of the awards in the set of facts. However, a listing of awards may be omitted for an actor that has not yet won any awards.

The set of facts that are presented for a particular entity may be based on previously received search queries that referenced the particular entity. For example, if a significant number, e.g., at least a threshold number, of previously received search queries have referenced a person's height, then the person's height may be included in the set of facts that are presented in a knowledge panel for that person. In general, the facts for an entity can be ranked based on the number of the previously received search queries that have been deemed to be requesting information about the entity and that have been deemed to be requesting information about that fact. The number of search queries may be weighted such that more recent queries are more heavily weighted. This may be useful, for example, when there is a sharp spike in interest. For a recent spike, this will enhance the weight of the spike, and for a spike further in the past, this will reduce the weight of the spike.

Each of the standard types of content items, e.g., title, image, description, and set of facts, can consistently be located in a same portion of the knowledge panel to provide a consistent user interface across knowledge panels 113 for different types of entities. For example, an image may be located near the top left corner of the knowledge panel and the description and facts may be located to the right of the image. If a content item for one of the types of content items is not available for an entity, then that type of content item may be replaced with another type of content item. For example, if an entity does not have an available image, one or more facts may be presented in the knowledge panel in place of an image. Note that the standard types of content items referenced throughout this document are provided above for purpose of example, and that other types of content items can be selected as standard content items.

The knowledge panel templates 113 store knowledge panel templates that can be populated with content items to generate a knowledge panel. In general, a knowledge panel template 113 specifies types of content items to include in the knowledge panel and includes placeholders for content items of the specified type. For example, a knowledge panel template may include placeholders for a title, one or more images, a description, a set of facts, and/or other types of content items.

The knowledge panel templates 113 can include one or more templates for each of a set of entity types. For example, the knowledge panel templates 113 may include one or more "person" templates, "place" templates, "landmark" templates, "movie" templates, "business" templates, "game" templates, "sports team" templates, "sports event" templates, and/or "disambiguation" templates. A knowledge panel template 113 for a particular type of entity may have placeholders for different content item types than a knowledge panel template for another type of entity. For example, a knowledge panel template for a country may include a placeholder for a set of images of cities in the country, the name of the capital city, and a list of points of interest; while a knowledge panel template for a landmark may include a placeholder for a set of images of other landmarks. Other types of content particular to a type of entity are described below.

The knowledge panel templates 113 may also include knowledge panel templates for entity subtypes. For example, under the "person" entity type, there may be an "actor" knowledge panel template, a "singer" knowledge panel template, and/or a "historical figure" knowledge panel template. A knowledge panel template for actors may include a placeholder for a set of images of movie or television show posters for movies or television shows in which the actor performed, while a knowledge panel template for singers may include a placeholder for a table element having information regarding songs released by the singer, as well as links to play the songs (perhaps by buying them first, such as with a single click).

Provisioning of contextually relevant knowledge panels based on document content is described in more detail with reference to FIGS. 2 and 3, which are example user interfaces 200, 250, 300 and 350 for editing a document and displaying knowledge panels. The user interfaces 200, 250, 300 and 350 may be displayed on, for example, display screens of one of the user devices 106, based on data received from the document system 108. In these examples, the user interfaces 200, 250, 300 and 350 are document editors displayed in web browsers, but other user interfaces may be used. For example, a dedicated document editor application may be used, or another application (e.g., an e-mail application) may include a document editor.

In the interface 200, a new document 202 is displayed. The user has begun typing into the document, causing the user's input to appear in the document as text at the location of the cursor 204. In response to this typing, a system that created the interface 200 (e.g., the document system 108) can identify one or more factual entities that is described or referenced by the content of the document. In this case, the factual entity identified is a bear, which is described in the document. In another example, the same paragraph may be used to identify a yearly hibernation cycle factual entity. In general, a factual entity includes a single conceptual entity, such as a person, place, country, landmark, animal, historical event, organization, business, sports team, sporting event, movie, song, album, game, work of art, or any other entity. In some implementations, a factual entity is a concept, subject, or topic.

To identify a factual entity, the document system 108 can include an entity and context identifier 109. The entity and context identifier 109 can process the content of the document, e.g., text and images contained by the document, as well as metadata about the documents, e.g., document title, creation data, or access control lists. Using appropriate textual, semantic and other information processing algorithms, can identify one or more main subjects or entity of the document and the context in which the subjects are mentioned. The entity and context identifier 109 then generates, for example, a query for the knowledge panel system 110.

Once the factual entity and context has been determined, entity and context identifier 109 generates a query and provides the query to the knowledge panel system 110. The knowledge panel system 110, in turn, processes the query and generates a responsive knowledge panel. A variety of appropriate information retrieval and relevance determining search algorithms can be used to process the query to identify responsive content.

Figure 2:
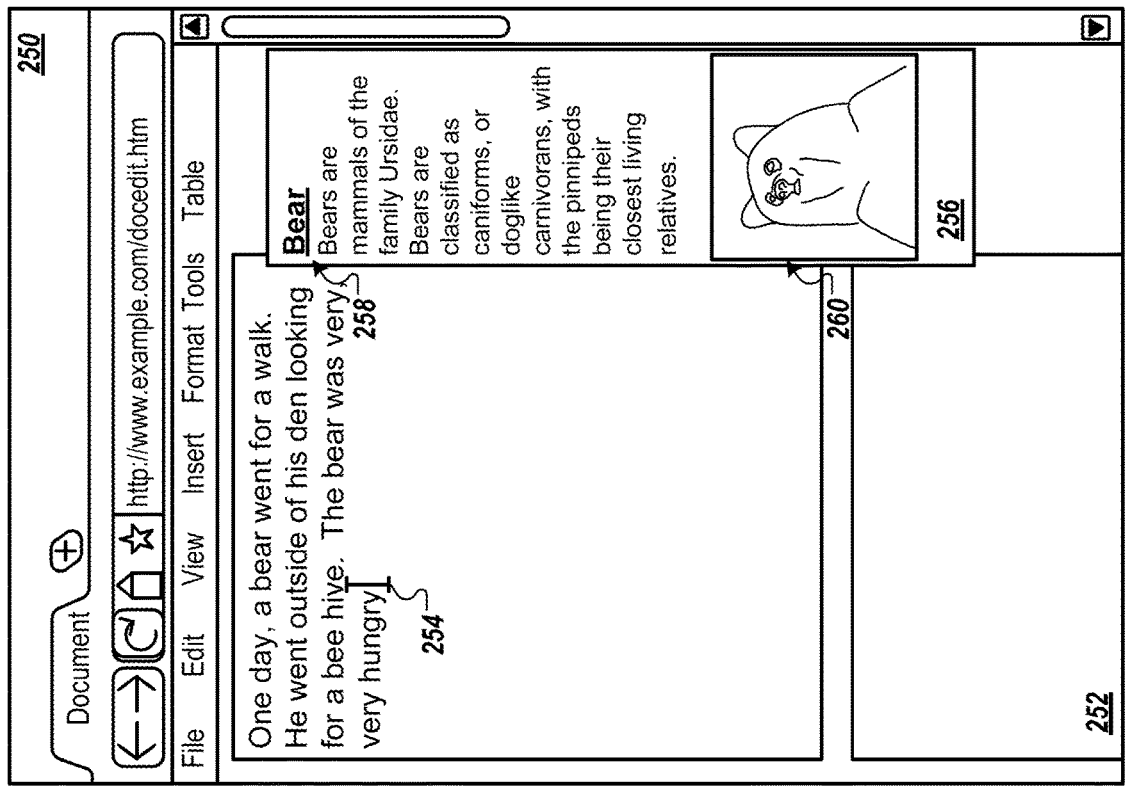
FIGS. 2 and 3 are example illustrations of user interfaces for editing a document and displaying knowledge panels.
Figure 2:
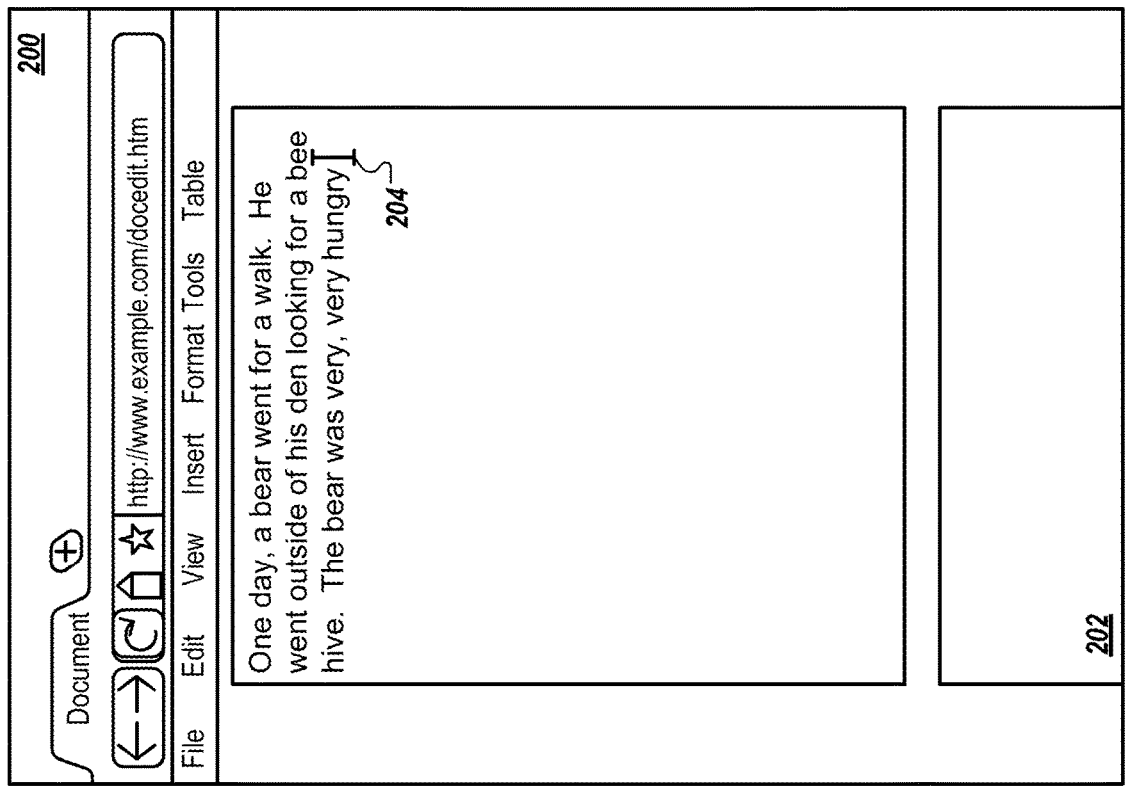

For example, in FIG. 2, the entity and context identifier 109 may analyze the text behind the cursor 204 and identify multiple entities—bear, bee, bee hive, hungry, etc. However, the entity and context identifier 109, using semantic and linguist models, determines that the dominant intent of the paragraph is directed to "bear" and thus generates the query "bear" and sends the query to the knowledge panel system 110. Alternatively, the knowledge panel system could determine that the information of interest is related to the interactions of the entities mentioned in the document and how they relate to each other. In this example, the interaction may be that bears eat honey produced by bees, and thus a query for "bear diet" could be sent, even though the term "bear diet" does not itself appear in the document.

In an alternative, queries may be structured in natural language instead of just keywords. For example, instead of "bear diet," a query of "What does a bear like to eat?" may be created and submitted. In either case, the query can be displayed to the user as part of displaying the knowledge panel. For example, when a new knowledge panel is to be presented, the previous knowledge panel may be removed, and the query may be displayed to the user before the knowledge panel containing the answer is displayed to the user. This may, depending on configuration, create a user experience in which a question-and-answer session is created for the user's benefit.

The interface 200 can update to the display 250 and present the knowledge panel 256 received from the knowledge panel system 110 to the user. The knowledge panel 256, as shown in FIG. 2, be composed from a template with content related to the identified factual entity—a bear. The knowledge panel 256 includes a brief description 258 (e.g., with content indexed from an encyclopedia) and a picture (e.g., selected from an image web search).

As shown, the interface 250 has also resized the document 252 to create a supplementary area for the knowledge panel 256 to be displayed in. In this case, the knowledge panel 256 and the document 252 are shown partially overlapping, but other aesthetic arrangements may be used. In any case, the interface 250 includes a content area to display the document 252 and a supplementary area to contemporaneously display the knowledge panel 256.

After reviewing the knowledge panel 256, the user may wish to incorporate an element of the knowledge panel 256 into the document 252. For example, the user may select and copy the description 258 or, as is shown in FIG. 3, the user may drag and drop the image 260 into the document 252. The type of drag and drop may depend, for example, on the input hardware available. When a mouse is available, a user may hold a mouse button down to begin the drag and release to being the drop. On a touch-screen interface, the user may use their finger to drag and drop.

As the user continues to edit the document, the entity and context identifier 109 continues to process the content and determines whether to provide additional automatically formulated queries to the knowledge panel system 110. For example, in the interface 300, the document 302 shows that the image 306 of the bear has been edited into the document 302 in response to the user's drag and drop. The document 302 has also been updated with additional text written by the user.

This additional text is used to identify a second logical entity for which a threshold intent measure is determined—the Smokey Mountains. The threshold intent measure may be, for example, a measure of confidence that a particular entity is a main subject in a sentence, a paragraph, or a section. In some cases, the interface 350 may not update to the new knowledge panel right away. For example, the interface 350 may delay for a particular time interval, until a particular number of words are written, or until the threshold intent is greater than the measure of confidence. This may avoid, for example a user beginning a document with the work "The," and immediately displaying a knowledge panel related to English language articles.

In some implementations, the interface 350 can be updated to display a knowledge panel (not shown) that includes content related to mountains. Such a knowledge panel may have, for example, statistics about the number of peaks in the Smokey Mountains, or an image of the Smokey Mountains, etc. In this case, the computer system that generated the interface 350 has generated a knowledge panel 356 with a map 358 of the Smokey Mountains. Additionally, the computer system has identified content that applies to the logical union of bears and the Smokey Mountain—black bears, which are the most populous bears in the Smokey Mountains. In response, the query [bears "Smokey Mountains"] may be generated and provided to the knowledge panel system 110. Accordingly, the knowledge panel 356 includes text 360 describing this fact.

Figure 3:
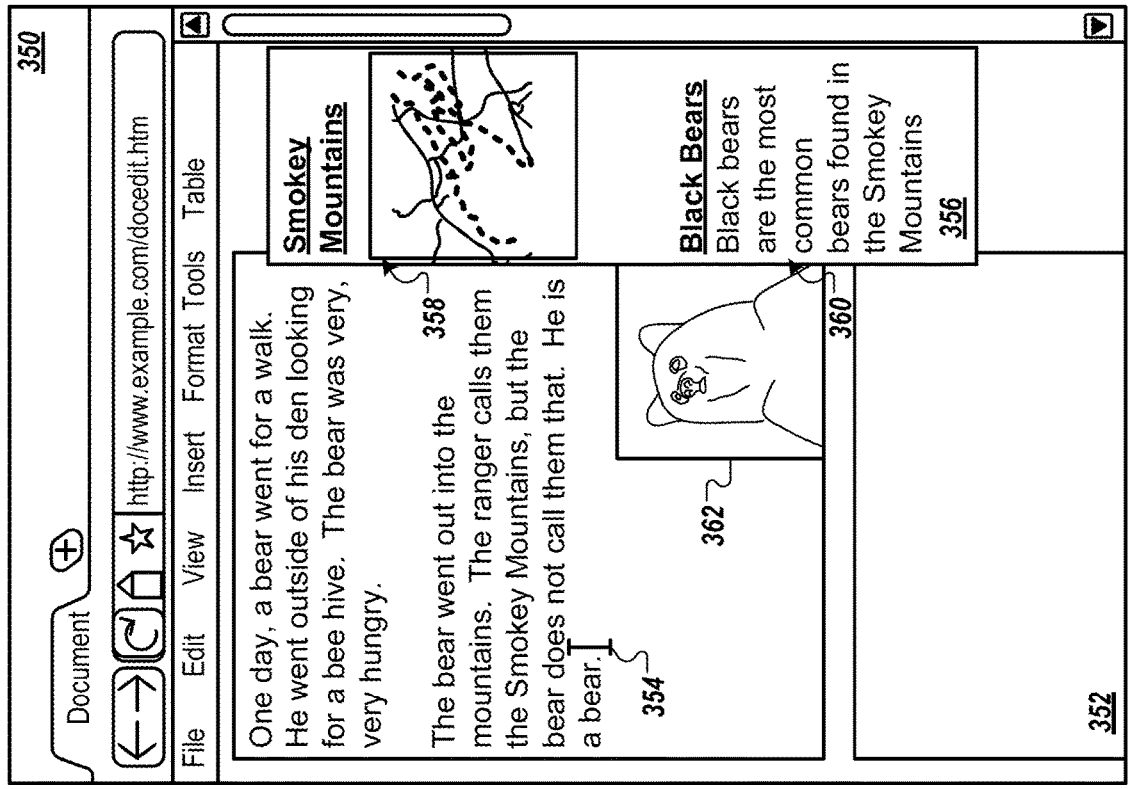
Figure 3:
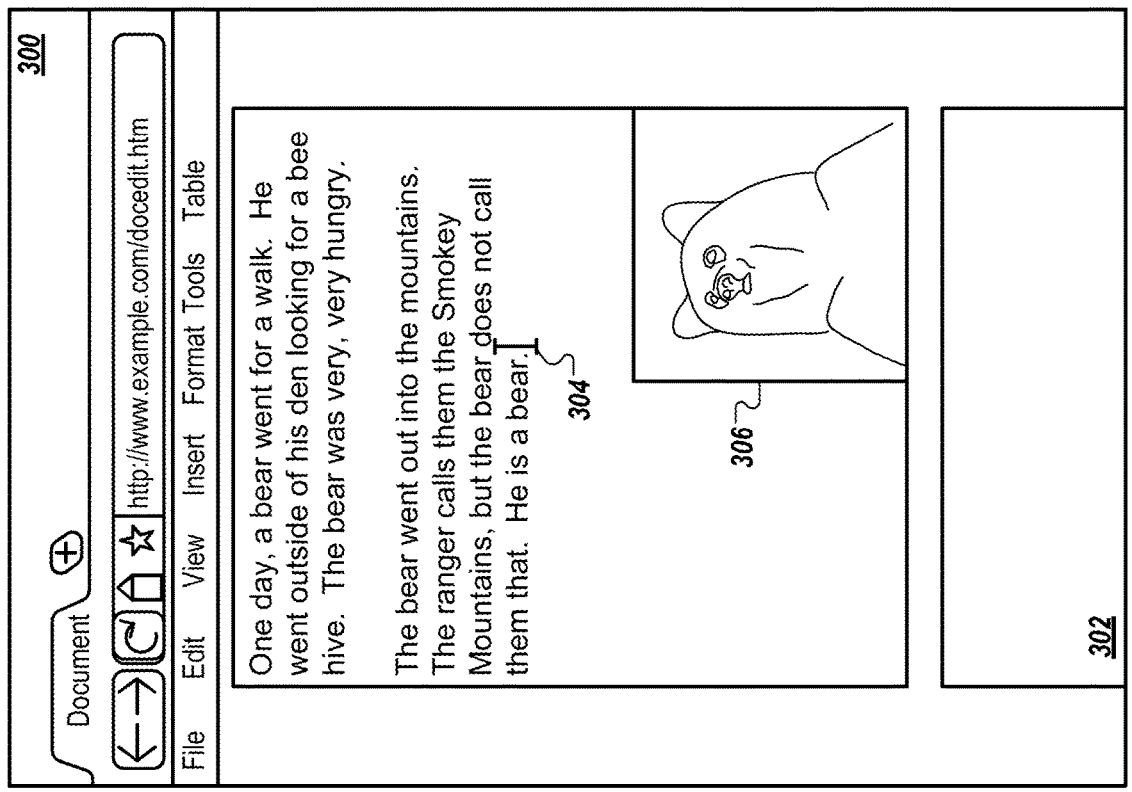

Although only one knowledge panel is shown in FIG. 3, the knowledge panels provided may be stacked so that the user can page through them. Alternately, a block of text may be "tagged" with a "comment" type indicator, the selection of which instantiates a knowledge panel corresponding to the tagged text.

As the user continues to write content in this document, the computer system can continue to identify logical entities in or related to the content story and display associated knowledge panels. Later, the user may save the document and send it to another user to review. As the second user reads the document, the computer system can generate knowledge panels related to the portion of the document that the reader is reading, even if the reader does not edit the document as they read it.

For example, as the second user reads the document, the computer system may track the reader's location and generate the same, or different, knowledge panels to display. In some cases, the computer system can track one or more document location indicators representing a portion of the document that is being displayed. One type of document location indicator may be a scrollbar location that indicates a location in the document. Another type of indicator may be the location of the user's cursor in the document.

In some cases, the computer system may identify a factual entity based on users that are identified in the document as well as users that have access to the document. For example, if the author of the document drafts the document to include information about another user, the computer system may identify organizations that are related to both users. These organizations may be an enterprise (e.g., both the author and other user work for the same company or attend the same school), a mailing list (e.g., both the author and user are on a mailing list within an enterprise or associated with an internet forum), or an email conversation between the first and second user. In such a case, the system can generate a knowledge panel for the enterprise, the mailing list, and/or the email conversation.

As a user, either the author or the reader, has the document displayed, they may interact with a knowledge panel to load a supplementary document. For example, when the knowledge panel is showing a map tile, the user may click or tap on the map tile to load a larger, more detailed, map. This larger map may be loaded and displayed contemporaneously with the document, it may replace the document, or it may load into a separate window or detachable interface element. Other types of documents are possible. For example, if the user selects a snippet from an encyclopedia, the full page of the encyclopedia may be loaded.

As described above, elements of a knowledge panel may be dragged or otherwise copied into the document by the document's editor. In some cases, the computer system may add content indicating the source of the information added. In one example of this kind of use, a knowledge panel lists a celebrities date and place of birth. When the user drags this knowledge panel into the document, the computer system may be configured to translate this information into prose suitable for a news article. For example, a knowledge panel may include the text "Born: Dec. 1, 1983. Location: Athens, Greece." The system may reformat this information to "He was born on December first, 1983 in Athens."

In another configuration, quotes taken from a knowledge panel may be added to the document with quotations and bibliographic citations added. For example, a knowledge panel related to Benjamin Franklin may contain a passage from his autobiography. A user selecting that passage may cause the passage to be added, with quotation mark in the document surrounding the passage (e.g. "Mr. Denham took a store in Water-street, where we open'd our goods; I attended the business diligently, studied accounts, and grew, in a little time, expert at selling."). A bibliographic citation may also be generated in the document, citing the source of the quotation (e.g., Franklin, B., & Labaree, L. (1964). The autobiography of Benjamin Franklin. New Haven: Yale University Press.)

In other instances where more than one factual entity is identified, and/or when more than one knowledge panel can be created for a single factual entities, the system may create more than one knowledge panel for contemporaneous display with the document. The multiple knowledge panels may be displayed according to many different types of layouts. In one layout, every knowledge panel may be displayed. This may be appropriate, for example, on a system with a large display such as a desktop computer. In another layout, the panel may be sorted into an ordered stack, and the knowledge panels may be shown as a stack of panel wherein the top panel is fully readable, and the other panels are partially or completely occluded by the top panel. In such a case, an interface element may be provided to let the user select one of the occluded knowledge panels.

In some cases, a knowledge panel can be created taking into account prior documents authored or viewed by a user. For example, if a university professor starts authoring a document about a particular politician's foreign policy and a fourth grade student starts authoring another document about the same politician, the knowledge panel appearing at the beginning of each document can be customized for each user based on an understanding of prior documents authored, emails sent/received, web content viewed, e-books read, and other contextual sources. These sources may be stored locally or remotely. The knowledge panel presented to the professor may include snippets from a recent news report, while the knowledge panel presented to the fourth grader may include a snippet from a general encyclopedia page. The knowledge panel can be recommended based on a level of comprehension or depth of familiarity that is stored or calculated for a user or for a document (e.g., based on title, metadata, or application used to author the document).

Knowledge panels may also include automatically generated charts or graphs based on references to data in the document being authored. For example, a user might be writing about the increase in the price of gold from 1980 to today. The knowledge panel system may pull raw data from a data source and automatically generate a graph showing the gold price from 1980 to the present, with or without inflation adjustment if a variable like this was mentioned in the document. Any technologically appropriate quantitative data and/or changes over time can be represented in such graphs or charts that can be automatically generated based on the user typing in a body of text.

Information in the knowledge panel may be dynamic. For example, in addition to historic gold prices, a knowledge panel may also show the real-time, present value of gold. Additionally, if the user edits a document to change the discussed range of 1980-present to 1975-present, the displayed chart of gold prices may dynamically change to include 1975-present.

Knowledge panels can include maps with overlayed annotations that tie back to the text. For example, in a discussion about the top five oil producing countries within a document, the knowledge panel system can pull raw data from an external system, highlight the five countries on the map and show how much oil each country produces. If the document discusses where these countries export their oil to, this too can be automatically overlayed on the same or a similar map as export routes to consuming countries. These knowledge panels can be presented as visually beautiful infographics that can be then pulled into the document by dragging them.

Videos can be inserted into knowledge panels. For example, relevant segments within a video can be captured and linked based on annotations in the video or using voice-to-text and natural language understanding. Segments can also be selected based on the frequency of a reference within the media or on the web. For example, if writing about President Kennedy's goal to put a man on the moon, the exact clip from his very famous speech can appear in a knowledge panel along with references of when he delivered the speech, to who, where, when, and other facts.

Knowledge panels showing that a user has authored an incorrect fact may be shown. For example, if a user authors a line of content to say a particular person was born in 1897, a knowledge panel with the correct date of birth of 1997 may be shown. The knowledge panel may be given a special presentation format to draw the user's attention. For example, the date of birth may be highlighted, the knowledge panel may be animated to pulse or appear to glow, and/or the presentation of the knowledge panel may be accompanied by an auditory alert.

Another type of application that may use knowledge panels is a personal assistant application or calendaring application. For example, in a work context, a user's next meeting can be shown in a knowledge panel that contains profiles of the people the user is meeting with, links to relevant emails, etc. The source documents for this information can include private data stored on a company's intranet, public information from, for example, social networking profiles, and/or other technologically appropriate sources.

Figure 4:
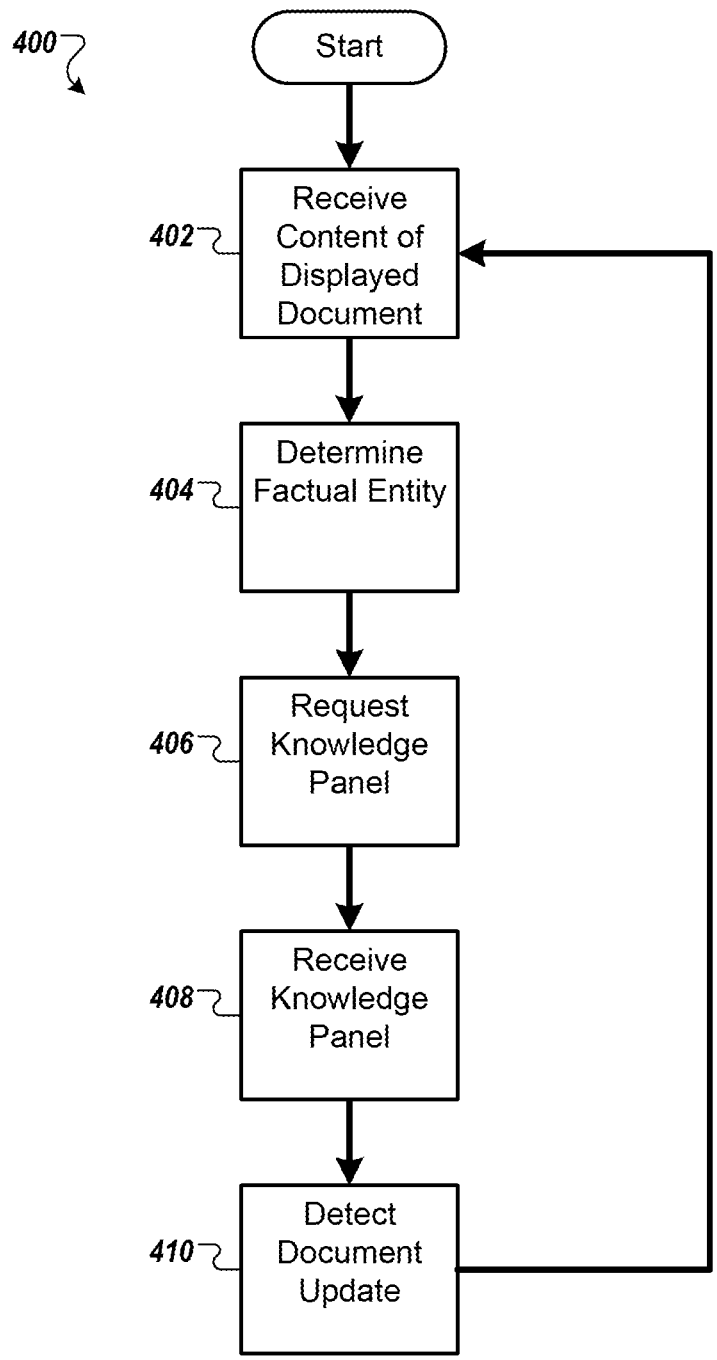
FIG. 4 is flowchart of a process for displaying knowledge panels.

FIG. 4 is flowchart of a process 400 for displaying knowledge panels. The process 400 may be performed by, for example, the document system 108. As such, for the sake of description, the process 400 will be described with reference to the system 100. However, another system or systems may be used to perform the process 400 or other similar processes.

Content of a displayed document is received (402). For example, the document system 108 may get a request for a document from one of the user device 106. The document system may retrieve the document from the documents 109 and serve the document to the user device 106. Additionally, the document system 108 may scan the document to identify the content of the document. Documents may include, but are not limited to, databases, spreadsheets, maps, images, videos, audio files, emails, chat messages, chat logs, books, magazines, newspapers, journals, and/or papers. Some documents may be analogs of real-world documents (e.g., an email may be an analog to a postal letter) and some documents may not be analogs of real-world documents (e.g., an input field in an application.)

A factual entity is determined (404). For example, the document system 108 may identify interesting, unique, or rare terms in the content of the document. One process for identifying such terms is called Term Frequency-Inverse Document Frequency. In general, this is a statistical process that identifies a word or words that occur in a document at a much greater frequency than in a training corpus. In another example, the document system 108 may use linguistic rules and heuristics to identify a factual entity from the content. For example, in many English language texts, a subject and object of the first sentence of a paragraph may identify or be a factual entity, or used to identify a factual entity that is not explicitly stated.

Content for a knowledge panel is requested (406). For example, the document system 108 can send a request to the knowledge panel system 110 for content about the factual entity. This request may be for just the content to be displayed in a knowledge panel (e.g., text in a structured format) or may be data representing or renderable into a knowledge panel, or other appropriate data. Content for the knowledge panel is received (408). For example, the document system 108 can receive a response from the knowledge panel system 110. This response may include, for example, just content to be populated into a knowledge panel template. An example of this may be an .XML, file with text fields holding values to be filled into text fields of a template. In another example, the response may include data representing or renderable into a knowledge panel, or other appropriate data. For example, the response may contain a data object that, when processed by the document system, creates a graphical user interface object that constitutes the knowledge panel.

The knowledge panel is displayed. For example, the document system 108 can update the display or service of the document to the user device 106 to cause the knowledge panel to be displayed contemporaneously with the document. If, for example, the document system 108 serves the documents editor, the document system 108 may update the document editor to include the knowledge panel. If an application on the user device 106 displays the document, the document system 108 can serve the content to be displayed in a knowledge panel, data representing or renderable into a knowledge panel, or other appropriate data to the application for rendering to the user.

An update to the document is detected (410). For example, the user may make changes to an existing portion of the document, or may add new content to the document. In such a case, the document system 108 may repeat the process 400, possibly identifying a new logical entity in the updated portion of the document.

A particular number, type, and order of steps have been described. However, other numbers, types, and orders of steps may be used. For example, instead of requesting the knowledge panel from an external service, the document system 108 may generate the knowledge panel itself. As another example, the document may be a static document that the user cannot or does not update.

Figure 5:
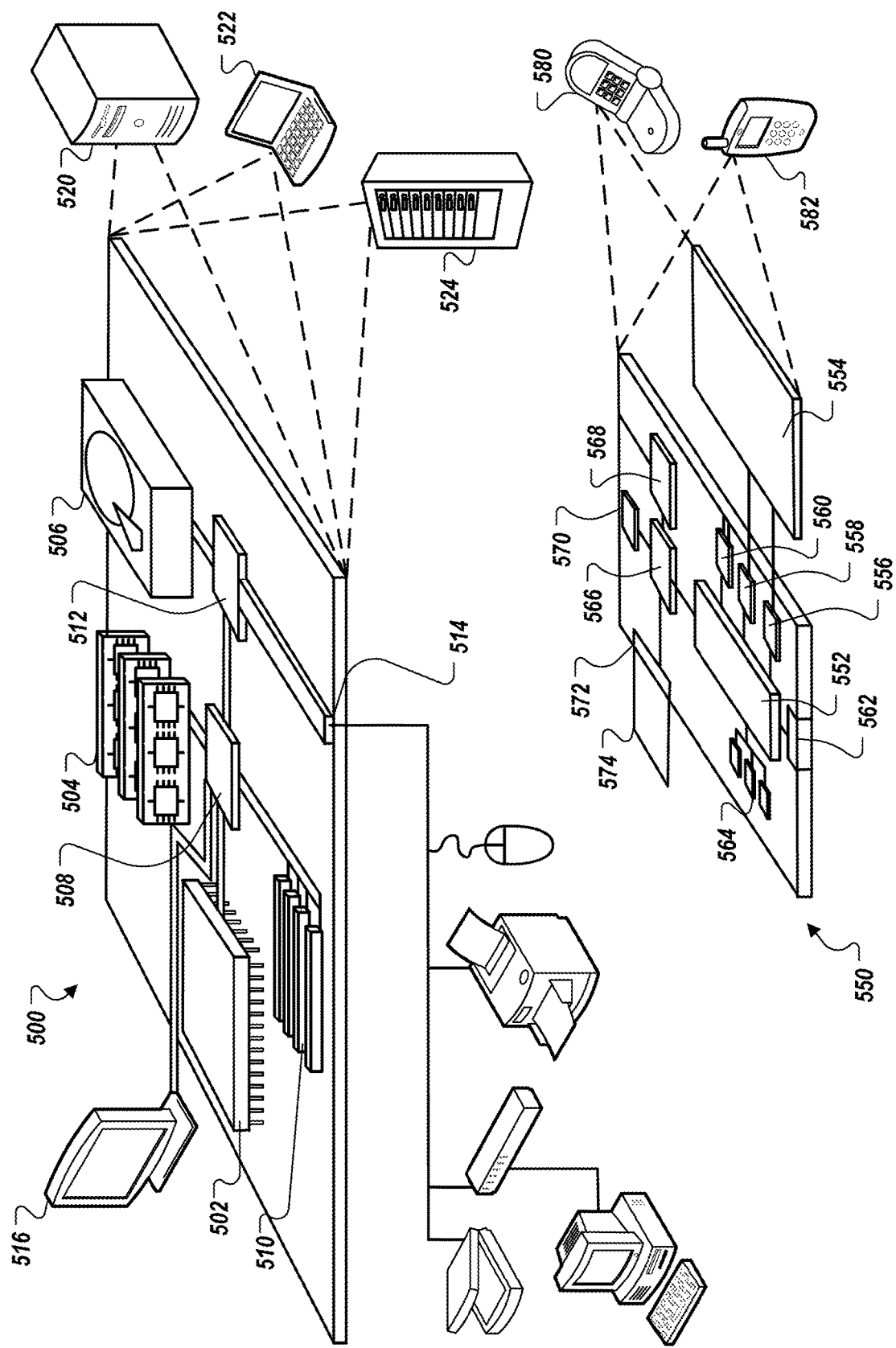
FIG. 5 is a schematic diagram that shows an example of a computing device and a mobile computing device.

FIG. 5 shows an example of a computing device 500 and an example of a mobile computing device that can be used to implement the techniques described here. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage.

Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method performed by a data processing apparatus, the method comprising:
    receiving content displayed within a display environment that is displayed on a user device as the content is being typed into the display environment by a user;
    determining, while receiving a first portion of the content being typed in the display environment that is displayed on a user device, and based on a second portion of the content that (i) was previously typed and (ii) is behind an input cursor included in the display environment, a first factual entity related to the second portion of content that is behind the input cursor;
    after determining the first factual entity and while receiving a third portion of the content being typed and based on (i) the first portion of the content that was previously typed and (ii) the second portion content that was previously typed, that both collectively comprise an updated portion of content that occurs in the display environment, determining a second factual entity that is related to the first portion of the content, the second portion of the content, and the third portion of the content, the determining the second factual entity comprising:
        determining that a measured level of intent for the third portion of the content is greater than a threshold level of intent; and
        in response to determining that the measured level of intent for the third portion of the content is greater than the threshold level of intent, determining the second factual entity that is related to the first portion of the content, the second portion of the content, and the third portion of the content;
    requesting, for a user interface element, content that is related to both the first factual entity and the second factual entity, wherein the user interface element provides a collection of content related to the first factual entity and the second factual entity within the display environment;
    receiving the content of the user interface element for contemporaneous display on the user device with the content of the display environment; and
    providing, to the user device, instructions to cause display of the content in the user interface element with the display environment.

2. The method of claim 1, the method further comprising:
    providing, to the user device, instructions to cause display of the first factual entity and the second factual entity with the content of the user interface element.

3. The method of claim 1, wherein the display environment is a document display environment, and wherein the document display environment displays a document authored by the user.

4. The method of claim 1, further comprising:
    after providing instructions to cause display of the content of the user interface element with the display environment:
        receiving additional content that is typed in the display environment after the first portion of the content that was typed in the display environment;
        determining, in response to the additional content, a third factual entity related to the additional content;
        requesting, for the user interface element, updated content that is related to the first factual entity, the second factual entity, and the third factual entity;
        receiving the updated content of the user interface element for contemporaneous display on the user device with the content of the display environment; and
        providing, to the user device, instructions to cause display of the updated content in the user interface element with the display environment.

5. The method of claim 1, wherein:
    the user interface element comprises an input element configured to receive input from the user device; and
    the method further comprises:
        receiving an indication that the user device supplied input to input element; and
        inserting a portion of the content displayed in the user interface element into the content of the display environment.

6. A non-transitory computer storage medium encoded with computer program instructions that, when executed by one or more processors, cause a computer device to perform operations comprising:
    receiving content displayed within a display environment that is displayed on a user device as the content is being typed into the display environment by a user;
    determining, while receiving a first portion of the content being typed in the display environment that is displayed on a user device, and based on a second portion of the content that (i) was previously typed and (ii) is behind an input cursor included in the display environment, a first factual entity related to the second portion of content that is behind the input cursor;
    after determining the first factual entity and while receiving a third portion of the content being typed and based on (i) the first portion of the content that was previously typed and (ii) the second portion content that was previously typed, that both collectively comprise an updated portion of content that occurs in the display environment, determining a second factual entity that is related to the first portion of the content, the second portion of the content, and the third portion of the content, the determining the second factual entity comprising:

determining that a measured level of intent for the third portion of the content is greater than a threshold level of intent; and in response to determining that the measured level of intent for the third portion of the content is greater than the threshold level of intent, determining the second factual entity that is related to the first portion of the content, the second portion of the content, and the third portion of the content;

requesting, for a user interface element, content that is related to both the first factual entity and the second factual entity, wherein the user interface element provides a collection of content related to the first factual entity and the second factual entity within the display environment;

receiving the content of the user interface element for contemporaneous display on the user device with the content of the display environment; and providing, to the user device, instructions to cause display of the content in the user interface element with the display environment.

7. The non-transitory computer storage medium of claim 6, the method further comprising:

providing, to the user device, instructions to cause display of the first factual entity and the second factual entity with the content of the user interface element.

8. The non-transitory computer storage medium of claim 6, wherein the display environment is a document display environment, and wherein the document display environment displays a document authored by the user.

9. The non-transitory computer storage medium of claim 6, the operations further comprising:

after providing instructions to cause display of the content of the user interface element with the display environment:

receiving additional content that is typed in the display environment after the first portion of the content that was typed in the display environment;

determining, in response to the additional content, a third factual entity related to the additional content;

requesting, for the user interface element, updated content that is related to the first factual entity, the second factual entity, and the third factual entity;

receiving the updated content of the user interface element for contemporaneous display on the user device with the content of the display environment; and providing, to the user device, instructions to cause display of the updated content in the user interface element with the display environment.

10. The non-transitory computer storage medium of claim 6, wherein:

the user interface element comprises an input element configured to receive input from the user device; and the operations further comprises:

receiving an indication that the user device supplied input to input element; and inserting a portion of the content displayed in the user interface element into the content of the display environment.

11. A system comprising:

one or more processors configured to execute computer program instructions; and computer storage media encoded with computer program instructions that, when executed by one or more processors, cause a computer device to perform operations comprising:

receiving content displayed within a display environment that is displayed on a user device as the content is being typed into the display environment by a user;

determining, while receiving a first portion of the content being typed in the display environment that is displayed on a user device, and based on a second portion of the content that (i) was previously typed and (ii) is behind an input cursor included in the display environment, a first factual entity related to the second portion of content that is behind the input cursor;

after determining the first factual entity and while receiving a third portion of the content being typed and based on (i) the first portion of the content that was previously typed and (ii) the second portion content that was previously typed, that both collectively comprise an updated portion of content that occurs in the display environment, determining a second factual entity that is related to the first portion of the content, the second portion of the content, and the third portion of the content, the determining the second factual entity comprising:

determining that a measured level of intent for the third portion of the content is greater than a threshold level of intent; and in response to determining that the measured level of intent for the third portion of the content is greater than the threshold level of intent, determining the second factual entity that is related to the first portion of the content, the second portion of the content, and the third portion of the content;

requesting, for a user interface element, content that is related to both the first factual entity and the second factual entity, wherein the user interface element provides a collection of content related to the first factual entity and the second factual entity within the display environment;

receiving the content of the user interface element for contemporaneous display on the user device with the content of the display environment; and providing, to the user device, instructions to cause display of the content in the user interface element with the display environment.

12. The system of claim 11, the method further comprising:

providing, to the user device, instructions to cause display of the first factual entity and the second factual entity with the content of the user interface element.

13. The system of claim 11, wherein the display environment is a document display environment, and wherein the document display environment displays a document authored by the user.

14. The system of claim 11, the operations further comprising:

after providing instructions to cause display of the content of the user interface element with the display environment:

receiving additional content that is typed in the display environment after the first portion of the content that was typed in the display environment;

determining, in response to the additional content, a third factual entity related to the additional content;

requesting, for the user interface element, updated content that is related to the first factual entity, the second factual entity, and the third factual entity;

receiving the updated content of the user interface element for contemporaneous display on the user device with the content of the display environment; and providing, to the user device, instructions to cause display of the updated content in the user interface element with the display environment.

15. The system of claim 11, wherein:

the user interface element comprises an input element configured to receive input from the user device; and the operations further comprises:

receiving an indication that the user device supplied input to input element; and inserting a portion of the content displayed in the user interface element into the content of the display environment.

\* \* \* \* \*